(12) United States Patent
Devriese et al.

(10) Patent No.: US 9,272,603 B2
(45) Date of Patent: Mar. 1, 2016

(54) AIR CONDITIONING SYSTEM HAVING IMPROVED CONDENSATE DRAINAGE

(75) Inventors: Tom Devriese, Veldegem (BE); Jan H. W. Raaben, Sint Andries-Brugge (BE); Koen Landuyt, Adegem (BE)

(73) Assignee: CNH Industrial America LLC, New Holland, PA (US)

( * ) Notice: Subject to any disclaimer, the term of this patent is extended or adjusted under 35 U.S.C. 154(b) by 313 days.

(21) Appl. No.: 13/805,974

(22) PCT Filed: Jun. 24, 2011

(86) PCT No.: PCT/EP2011/060660
§ 371 (c)(1),
(2), (4) Date: Mar. 11, 2013

(87) PCT Pub. No.: WO2011/161258
PCT Pub. Date: Dec. 29, 2011

(65) Prior Publication Data
US 2013/0186125 A1 Jul. 25, 2013

(30) Foreign Application Priority Data
Jun. 24, 2010 (BE) .................................. 2010/0374

(51) Int. Cl.
*B60H 1/32* (2006.01)
(52) U.S. Cl.
CPC .................................... *B60H 1/3233* (2013.01)
(58) Field of Classification Search
CPC . B60H 1/3233; F24F 2013/227; F24F 13/222
USPC .................................................. 62/288, 285
See application file for complete search history.

(56) References Cited

U.S. PATENT DOCUMENTS

| 2,685,779 | A | * | 8/1954 | Carapico, Sr. | 62/285 |
| 3,719,059 | A | * | 3/1973 | Cavis | 62/285 |
| 4,918,935 | A | * | 4/1990 | Trent | 62/93 |
| 5,826,440 | A | * | 10/1998 | Okada et al. | 62/239 |
| 6,584,795 | B1 | | 7/2003 | Bruss | |

FOREIGN PATENT DOCUMENTS

| EP | 1468852 A1 | 10/2004 |
| EP | 1790511 A2 | 5/2007 |
| FR | 2755646 A1 | 5/1998 |

* cited by examiner

*Primary Examiner* — Cassey D Bauer
(74) *Attorney, Agent, or Firm* — Patrick M. Sheldrake

(57) ABSTRACT

The invention relates to an air conditioning system for a cab of an agricultural machine, comprising:
an air conditioning unit that comprises an evaporator (23), a blower (25) for generating a reduced pressure in the air conditioning unit and supplying the conditioned air into the cab,
a condensate drain unite that comprises a reservoir (6) to which one or more drain pipes (7a, 7b) are connected, which lead to drain pipes (8a, 8b) that can be mounted in upright profile posts of the cab,
characterized in that the system further comprises one or more T-junctions (11a, 11b) or similar connection elements, and one or more supplementary pipe elements (10a, 10b), wherein each of the drain pipes (7a, 7b) is connected to an upright drain pipe (8a, 8b) via two branches of a T-junction (11a, 11b), wherein the inlet end of a supplementary pipe element (10a, 10b) is mounted onto the third branch of the T-junction and wherein the outlet end (12a, 12b) of each supplementary pipe element (10a, 10b) is located at the suction side of the blower.

9 Claims, 1 Drawing Sheet

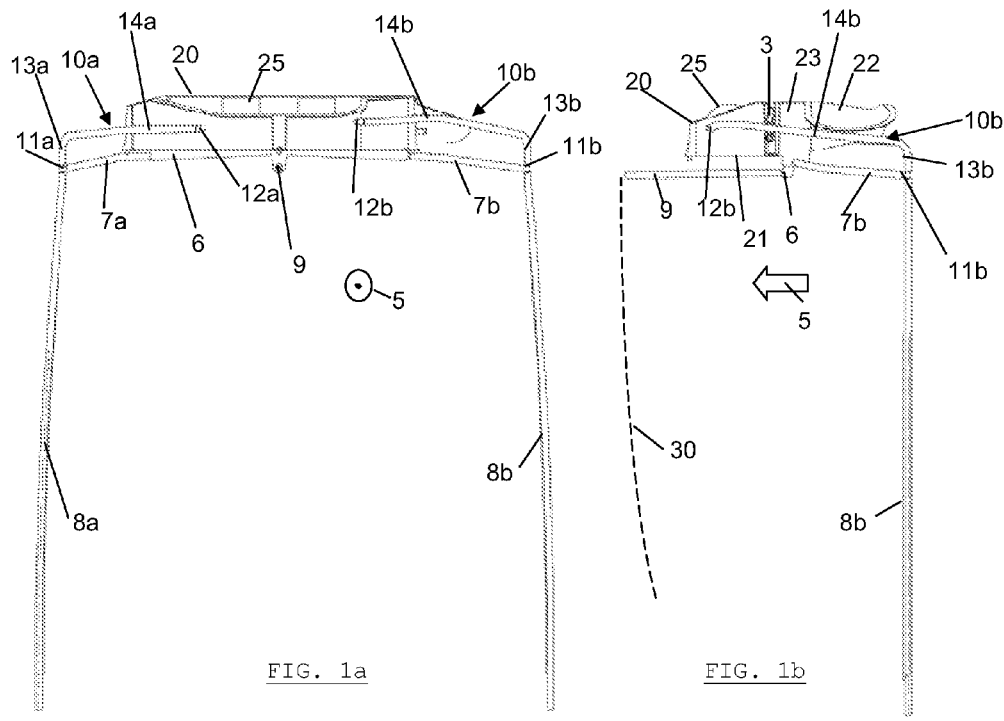
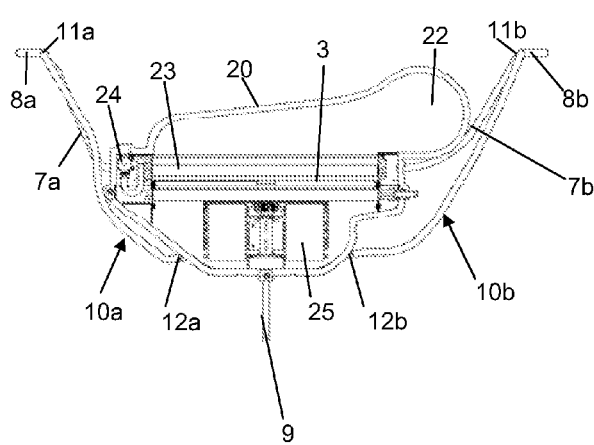

US 9,272,603 B2

AIR CONDITIONING SYSTEM HAVING IMPROVED CONDENSATE DRAINAGE

FIELD OR THE INVENTION

The invention relates to air conditioning systems in cabs of vehicles, in particular, in cabs of agricultural machines, such as combine or forage harvesters.

STATE OF THE ART

The air conditioning systems or HVAC systems (Heating Ventilation Air Conditioning) that are currently used in agricultural machines, have for standard components: a cooling circuit comprising a compressor, a condensor and an evaporator having an expansion valve, connected by pipes through which a coolant is circulating; a heating circuit comprising a heat exchanger, which is connected by pipes to the engine block; and a blower, which conveys the cooled or heated air to the cab. A HVAC system traditionally comprises a housing holding the evaporator, the heat exchanger and the blower, and further is equipped with a system for drainage of the condensate.

For the latter system drain pipes are connected to the housing. Sometimes, it is difficult to drain the condensate in an efficient manner because of the underpressure created at the suction side of the blower, which commonly is provided at the air outlet of the housing. This may cause the collection of a substantial amount of water at the bottom of the housing. Furthermore, the underpressure can draw in dust particles, which settle onto the inner wall of the drain pipe and thereby can cause blockage thereof. Therefore, sometimes a supplementary drain is provided besides the normal drain pipes, which supplementary drain has to function when the normal drain pipes are not capable of evacuating the condensate.

Other solutions are known, as shown in EP1359034, where the condensate drain is connected by a T-junction to the high pressure side of the blower, so as to avoid blocking of the pipe. However, the raise of the pressure at the inlet of the drain pipe hampers the drainage and thereby increases the risk of a quick accumulation of condensate in the housing. This problem becomes more outspoken when the drain pipe is not connected to the bottom, but to the side of the housing.

SUMMARY OF THE INVENTION

The invention offers a solution to the problems indicated above by providing a system as described in the accompanying claims.

According to the invention an air conditioning system for a cab of an agricultural machine comprises:
- an air conditioning unit that comprises a evaporator and a blower for generating a reduced pressure in the air conditioning unit and for supplying conditioned air to the cab, and
- a condensate drain unit that comprises a reservoir to which are connected one or more drain pipes, which lead to drain pipes which can be mounted in upright profile posts of the cab, characterised in that the system further comprises one or more T-junctions or similar connection elements, and one or more supplementary pipe elements, wherein each of the drain pipes is connected to an upright drain pipe via two branches of a T-junction, wherein the inlet end of a supplementary pipe element is mounted onto the third branch of the T-junction and wherein the outlet end of each supplementary pipe element is located at the suction side of the blower.

The supplementary pipe element provides for a permanent suction of the condensate from the drain pipe. This is particularly advantageous when the drain pipe is installed at a slight downward slope.

The reservoir preferably is incorporated into of a housing for the evaporator. The drain pipes then can be connected to the reservoir at the side of the air conditioning unit.

In a preferred embodiment the outlet end of the supplementary pipe elements register with the space between the evaporator and the blower. This space has a greater underpressure than the other spaces inside the housing.

The outlet ends of these pipe elements may also be located adjacent the inlet of the blower. This is where the pressure reduction is greatest.

Preferably the supplementary pipe element is provided with a first vertical section adjacent the T-junction.

BRIEF DESCRIPTION OF THE DRAWINGS

FIG. 1 shows an air conditioning system according to the invention, for use in the cab of an agricultural machine.
FIG. 1a shows a view from the front of the cab.
FIG. 1b shows the system of FIG. 1a, as seen from the left hand side.
FIG. 1c shows the system of FIG. 1a, as seen from the top.

DETAILED DESCRIPTION OF PREFERRED EMBODIMENTS

FIG. 1 shows an air conditioning system according to the invention, which is designed for use in the cab of an agricultural machine. The air conditioning system comprises an air conditioning unit (HVAC unit) and a condensate drain unit, which are described in further detail hereinafter. The cab is not drawn, but is located between the vertical drain pipes 8a, 8b, which can be mounted in upright profile sections of the cab, e.g. the corner posts or one of the posts to which doors or windows can be connected. FIG. 1a shows a view of the system as seen from the front of the cab. FIG. 1b shows a view seen from the left hand side of the cab, with an indication of the position of the windshield 30.

The air conditioning unit comprises a housing 20 having a central, downwardly extending air outlet 21 and a cover (not shown) having at the rear an inlet 22 for the air that has to be conditioned. A heat exchanger 3 is mounted transversely inside the housing 20, which heat exchanger is connected to the cooling circuit of the engine for heating the cab by means of the coolant of the engine. Behind the heat exchanger 3 there is an evaporator 23 provided with an expansion valve 24. The evaporator is connected via coolant lines (not shown), to a compressor and a condensor (equally not shown). The evaporator 23 constitutes together with the compressor, the condensor, the expansion valve 24 and the connecting lines the cooling circuit. The air conditioning unit further comprises a blower 25, which draws in the air through the heat exchanger 3 and the evaporator 23, in the direction of the arrow 5, and blows the cooled or heated air through the outlet opening 21 into the cab.

The air conditioning system further comprises a condensate drain unit, i.e. a system for drainage of water generated by condensation of water vapour in the air flow drawn onto the evaporator 23 by the blower 25. This drain system comprises a reservoir 6 provided below the evaporator 23. Preferably, the reservoir 6 is integrated into the housing 20 and provided in the bottom part of the housing 20. It collects the condensate that flows down the evaporator. The left and right bottom parts of the reservoir 6 slope slightly downwardly towards the sides of the cab, such that the water flows to the sides of the reservoir, from where it is drained via pipes 7a and 7b to the long drain pipes 8a and 8b, which are mounted into the upright profile posts of the cab. The pipes 7a and 7b are arranged horizontally or, preferably, with a slight downward slope. When a machine is running on a lateral slope, the water is collected at one side. At the centre of the housing 20 is a supplementary drain pipe 9 having one end connected to the reservoir 6 and the other end terminating in front of the windshield 30. The system as described so far, comprising two drain pipes at the sides and one central drain, is known as such. Herein central drain pipe 9 acts as a supplementary overflow, which functions when a lot of condensate has accumulated in the reservoir. This occurs when, e.g., the side drain pipes or pipes 7, 8 are blocked. The overflow also functions when the machine suddenly tilts sideways and the condensate at the one side of the housing 20 flows to the other side or when the machine transits from an upward slope to a downward slope. Because the drain pipes 7, 8 at the sides are connected to the underpressure zone created by the operation of the blower, it frequently happened that a layer of water stayed behind in the reservoir 6 and in the horizontal sections 7 of the drain pipes. This water then accumulated below the evaporator 23 until it was drained via the central drain pipe 9 to the front of the cab. The condensate mingled with the dust on the outside of the windshield and thus caused visibility problems.

The present invention offers a solution to this problem by providing supplementary pipe elements 10a and 10b at both sides, which elements are connected via a T-junction 11a/11b to the side drain pipes 7a/8a and 7b/8b, respectively. In particular: a T-junction 11a is provided where the horizontal pipe 7a transitions into the upright drain pipe 8a; to the horizontal branch of the T-junction is connected the lateral pipe 7a, to the lower vertical branch the drain pipe 8a, and to the upper vertical branch the inlet end of the supplementary pipe element 10a (the other side is similar, comprising elements 7b, 8b, 10b and 11b). As shown in the side view of FIG. 1b, the outlet ends of the supplementary pipe elements 10a, 10b are located at the front portion of the housing 20 of the HVAC unit, where the pipe elements register via openings 12a, 12b in the housing with the inner space of this housing. As the blower creates a reduced pressure inside the front portion of the housing 20, the pressure is here lower than the pressure adjacent the T-junction 11a/11b. This creates inside the T-junction an extra underpressure and a permanent air flow, which ensures the lateral drainage of condensate, via pipes 7 and drain pipes 8. Consequently, the risk of water accumulating in the reservoir is reduced. Hence, the central drain 9 will have to operate less frequently. Preferably, the supplementary pipe elements 10a, 10b have at their inlet ends (at the T-junction) a vertical section 13a, 13b, followed by an inclined or a horizontal section 14a, 14b, that continues up to the outlet end of the pipe elements, at the opening 12a, 12b in the housing. The reduced pressure at the upper vertical branch of the T-junction 11 can suck up some drops of condensate a little, but these settle on the inner walls of the vertical sections 13a, 13b of the pipe elements 10a, 10b and then run down along these walls into the drain pipes 8a, 8b.

The invention is not limited to the specific embodiment shown in the figures and described hereabove. For instance, a system according to the invention can be provided without the central drain 9. In principle, one can use a single drain pipe 7+8, provided with one supplementary pipe element 10, or one can also provide more than two of the combination 7+8+10. Instead of the T-shaped parts any similar connection element can be used. The orientation of the branches of the T-junction does not have to be as drawn or described above. What matters is that, at one location, a connection of three pipe elements, 7, 8, 10 has been made. In principle, the pipe elements 7, 8, 10 even can be configured as a homogeneous part. The pipes and tubes can be composed of flexible materials or pre-formed metal or plastic tubes. It is not required that the blower 25 is located inside the housing 20, but it may also be connected to the exterior of the actual housing 20.

In the embodiment shown in FIG. 1, the outlet ends of the supplementary pipe elements are located at the housing 20 itself (i.e., adjacent the holes 12a, 12b in the housing from which the pipe elements start). Possibly, the outlet end may also be located between the blower 25 and the evaporator 23, or next to the inlet of the blower (in other words, where the pressure is lowest).

The invention claimed is:

1. An air conditioning system for a cab of an agricultural machine, comprising:
   an air conditioning unit that comprises a evaporator and a blower for generating a reduced pressure in the air conditioning unit and supplying conditioned air to the cab, the blower positioned to pull air through the evaporator; and
   a condensate drain unit that comprises a reservoir to which are connected one or more first drain pipes, which lead to generally upright second drain pipes that can be mounted in upright profile posts of the cab,
   wherein the system further comprises one or more junctions configured for intersecting pipe elements, and one or more supplementary pipe elements, wherein each of the first drain pipes is connected to the upright second drain pipe via two branches of the one or more junctions, wherein the inlet end of a supplementary pipe element is mounted onto a third branch of the junction and wherein the outlet end of each supplementary pipe element is located at the suction side of the blower and the outlet end of the supplementary pipe elements is located in the air flow path in the space between the evaporator and the blower.

2. An air conditioning system according to claim 1, wherein the first drain pipe is installed at a slight downward slope.

3. An air conditioning system according to claim 1, wherein the air conditioning unit includes a housing for the evaporator and wherein the reservoir is incorporated into said housing.

4. An air conditioning system according to claim 3, wherein the connection between the reservoir and the first drain pipes is located at the side of the air conditioning unit.

5. An air conditioning system according to claim 1, wherein the outlet end of the supplementary pipe elements is located adjacent the inlet of the blower.

6. An air conditioning system according to claim 1, wherein the supplementary pipe elements have a vertical section adjacent the junction.

7. An air conditioning system according to claim 1, further including a central drain connected to the reservoir.

8. An air conditioning system according to claim 1, wherein the junction, supplementary pipe and first drain pipe are arranged with respect to the blower such that air flows through the first drain pipe, the junction and then the supplementary pipe.

9. An air conditioning system according to claim 1, in combination with a vehicle cab, wherein the upright second drain pipes are mounted in posts of the cab and supplementary pipe elements extend upwardly from the junction toward a housing that includes the evaporator and reservoir and the blower is configured to blow air through an outlet opening into the cab.

* * * * *